(12) United States Patent
Iihoshi et al.

(10) Patent No.: US 7,139,635 B2
(45) Date of Patent: Nov. 21, 2006

(54) MULTI-SYSTEM NUMERICAL CONTROL DEVICE

(75) Inventors: Kouji Iihoshi, Yamanashi (JP); Hideo Ogino, Fujiyoshida (JP)

(73) Assignee: Fanuc Ltd, Yamanashi (JP)

( * ) Notice: Subject to any disclaimer, the term of this patent is extended or adjusted under 35 U.S.C. 154(b) by 375 days.

(21) Appl. No.: 10/639,485

(22) Filed: Aug. 13, 2003

(65) Prior Publication Data

US 2004/0039476 A1 Feb. 26, 2004

(30) Foreign Application Priority Data

Aug. 23, 2002 (JP) ............................. 2002-243488

(51) Int. Cl.
*G06F 19/00* (2006.01)
*G05B 19/18* (2006.01)

(52) U.S. Cl. ...................... 700/175; 700/181; 318/569
(58) Field of Classification Search .................. 700/86, 700/87, 175, 181; 318/569
See application file for complete search history.

(56) References Cited

U.S. PATENT DOCUMENTS

| 4,092,720 | A | * | 5/1978 | Carey ........................ 700/181 |
| 4,369,563 | A | | 1/1983 | Williamson |
| 4,607,327 | A | * | 8/1986 | Kishi et al. .................... 700/86 |
| 5,914,876 | A | * | 6/1999 | Hirai ............................ 700/87 |
| 6,892,110 | B1 | * | 5/2005 | Inoue et al. ................. 700/175 |
| 2004/0174130 | A1 | * | 9/2004 | Inoue et al. ................. 318/569 |

FOREIGN PATENT DOCUMENTS

| JP | 63-14204 | 1/1988 |
| WO | 02/25388 A1 | 3/2002 |

OTHER PUBLICATIONS

Notice of Reasons for Rejection dated Sep. 1, 2004.

* cited by examiner

*Primary Examiner*—Leo Picard
*Assistant Examiner*—Douglas S. Lee
(74) *Attorney, Agent, or Firm*—Staas & Halsey LLP

(57) ABSTRACT

Information of a machine control means to be selected for each system is inputted through a manual input unit and then stored in a storage unit for storing a selection state of the machine control means through a machine control means selecting unit. A machine control means execution unit executes the machine control means for each control system independently according to the selection state stored in the storage unit.

5 Claims, 4 Drawing Sheets

MULTI-SYSTEM NUMERICAL CONTROL DEVICE

BACKGROUND OF THE INVENTION

1. Field of the Invention

This invention relates to a numerical control device for controlling a machine tool, and more particularly, to a multi-system numerical control device for singly controlling a machine tool that performs a plurality of kinds of machining or other operations such as turning, milling and loader control.

2. Description of the Related Art

A preparatory function (G-code) of a machining program used for a numerical control device for controlling a machine tool has typically a great difference in instruction system between a lathe (turning) system and a milling system. Thus, either a following technique (1) or (2) has been applied to a case where a work requiring several machining functions such as turning and milling is machined.

(1) As shown in FIG. 1, turning is performed with a special purpose machine controlled by a numerical control device for turning, and then milling is performed with a special purpose machine controlled by a numerical control device for milling.

(2) As shown in FIG. 2, incorporating program data for turning and program data for milling into a single program, machining is performed with a machine controlled by a composite working machine numerical control device that executes control in such a manner as to switch machining between turning and milling in response to a program instruction.

Alternatively, a multi-system numerical control device having a plurality of program analysis means and execution means is also well known. However, a conventional multi-system numerical control device has not employed any means for selecting a machine control means for each system. Thus, a following technique (3) has been applied to a case where a work requiring several machining functions such as turning and milling is machined.

(3) As shown in FIG. 3, machining is performed with a special purpose machine controlled by a numerical control device having a plurality of turning systems and a special purpose machine controlled by a numerical control device having a plurality of milling systems.

The above conventional technique (1) has been extremely disadvantageous from a viewpoint of cost, because of need for the numerical control device for turning and the numerical control device for milling. In machining that needs turning and milling for a single work, this technique (1) requires much time for set-up operations such as removal and mounting of the work, and thereby presents a problem in degradation of working efficiency.

The above conventional technique (2) enables either of control for turning and control for milling to be executed within a single control device. However, this technique (2) employs a method of performing machining in such a manner as to alternately switch machining between turning and milling in the course of a series of machining processes, and thereby failed to apply turning and milling to a plurality of works simultaneously.

The above conventional technique (3) enables a plurality of works to be machined simultaneously, thanks to use of the multi-system numerical control device. However, the preparatory function (G-code) of a required machining program is different in instruction system between the lathe (turning) system and the milling system, so that it has been still necessary for this technique (3) to prepare a multi-system numerical control device for turning and a multi-system numerical control device for milling in order to perform lathing (turning) and milling simultaneously, like the above technique (1).

OBJECT AND SUMMARY OF THE INVENTION

An object of the present invention is to provide a multi-system numerical control device, which is capable of control for simultaneously performing various kinds of machining such as turning and milling whose preparatory functions (G-code) of a machining program are different from each other.

The present invention is configured to allow a multi-system numerical control device having a plurality of control systems to have a plurality of machine control means such as function for turning, function for milling and loader control function so as to make the machine control means storable and selectable for each system, thereby enabling desired machining to be performed simultaneously so as to be independent of a plurality of systems.

The multi-system numerical control device according to the present invention comprises a machine control means storage unit for storing information of a plurality of machine control means, a selecting unit for selecting the machine control means for each of the plurality of control systems, a selection state storage unit for storing a selection state of the machine control means selected for each control system by the selecting unit, and an execution unit for executing the machine control means for each control system independently according to the selection state stored in the selection state storage unit.

Each of the control systems includes a program analysis unit for analyzing a program specified by the execution unit and an execution means.

The machine control means is a program for attaining any one of various functions, such as turning function and milling function.

According to thus-configured multi-system numerical control device, the machine control means may be selected for each system to perform simultaneous and independent machine control for each system, so that machine control for different kinds of machining such as turning and milling is executable simultaneously.

BRIEF DESCRIPTION OF THE DRAWINGS

The foregoing object and features of the invention will become apparent from the following description of a preferred embodiment of the invention with reference to the accompanying drawings, in which.

DETAILED DESCRIPTION OF THE PREFERRED EMBODIMENT

Figure 1:
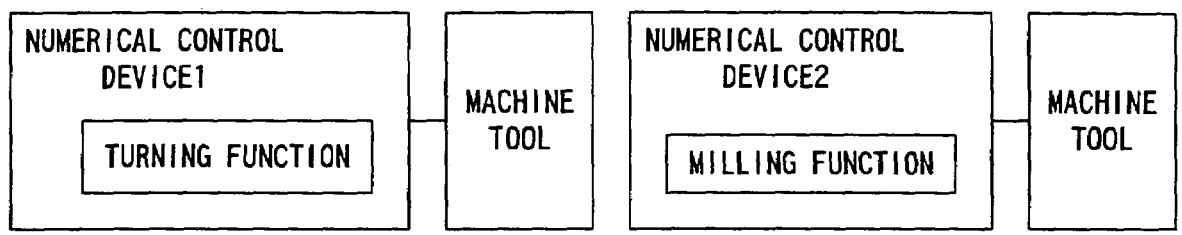
FIG. 1 illustrates a conventional technique that requires a numerical control device for turning and that for milling respectively.
Figure 2:
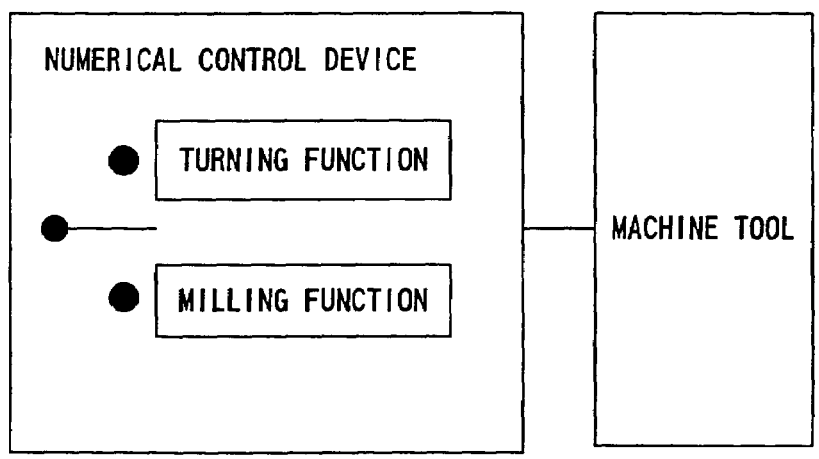
FIG. 2 illustrates another conventional technique using a composite working machine numerical control device that executes control in such a manner as to switch machining between turning and milling in response to a program instruction.
Figure 3:
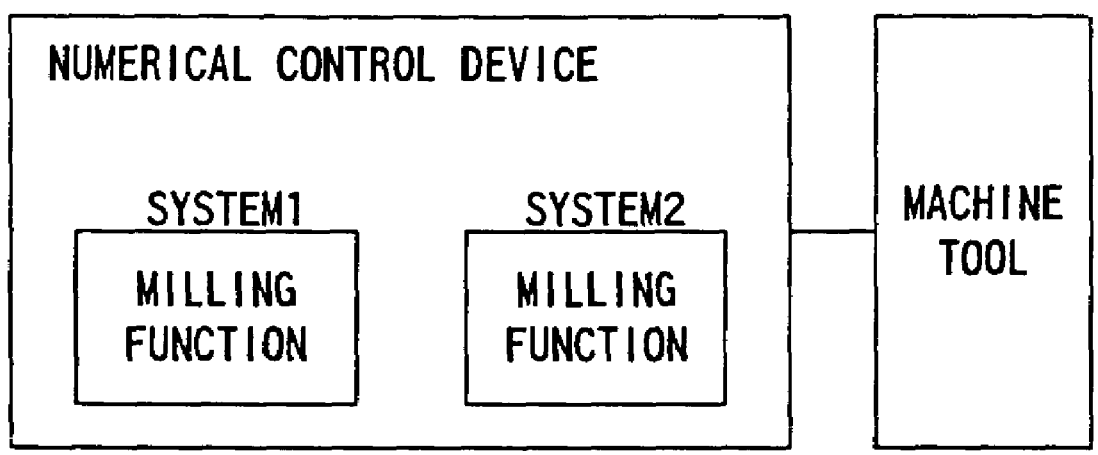
FIG. 3 illustrates a further conventional technique that performs machining with a special purpose machine controlled by a numerical control device having a plurality of turning systems and a special purpose machine controlled by a numerical control device having a plurality of milling systems.
Figure 3:
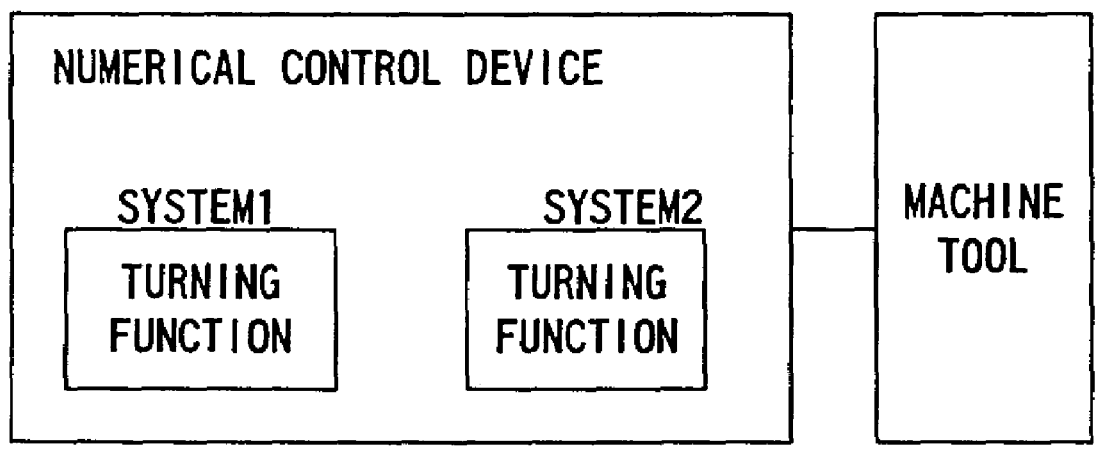
Figure 4:
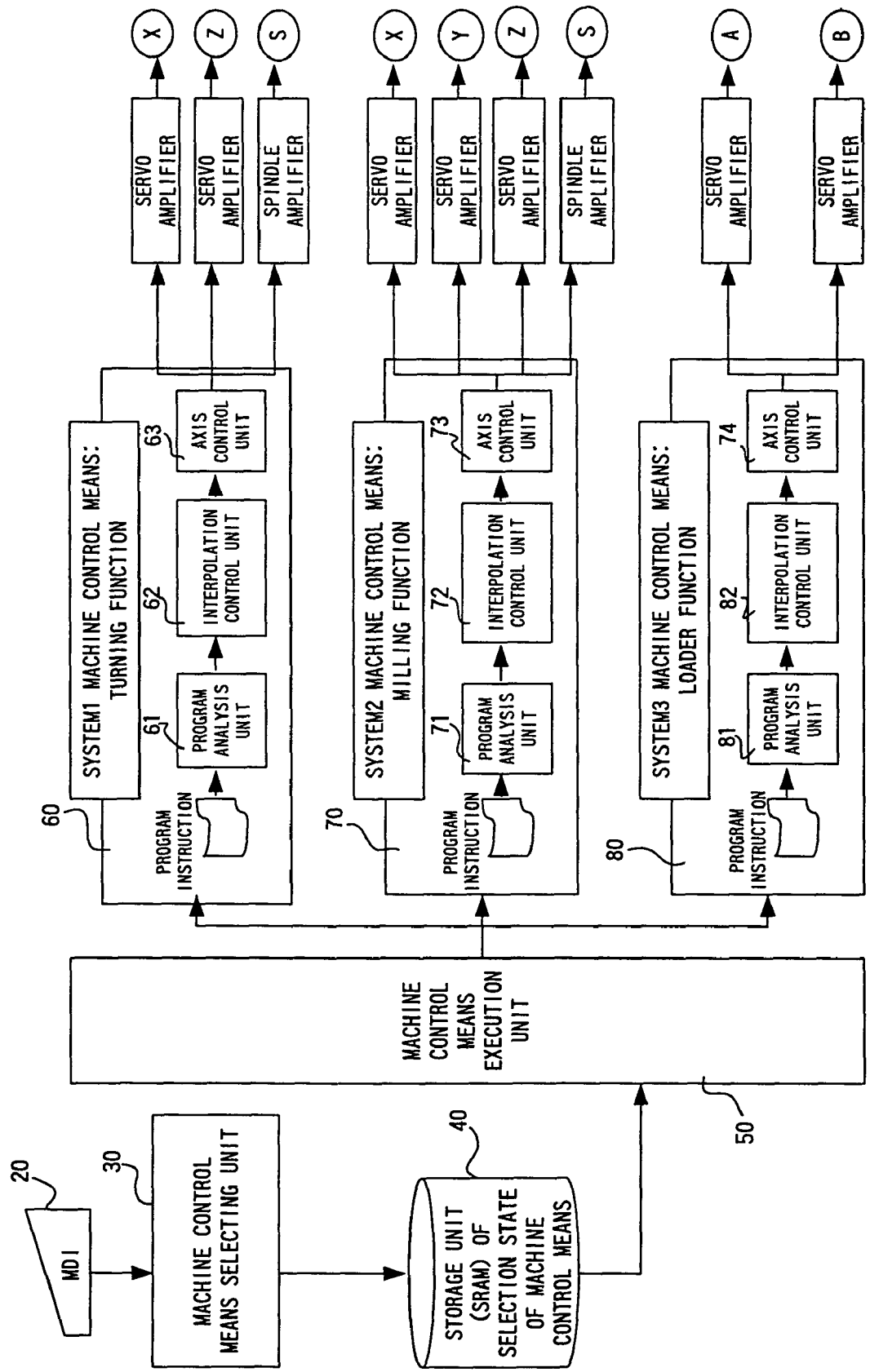
FIG. 4 is a block diagram for explaining a multi-system numerical control device according to an embodiment of the present invention.

FIG. 4 is a block diagram for explaining a schematic configuration of a multi-system numerical control device according to an embodiment of the present invention. The multi-system numerical control device of FIG. 4 has three control systems and is configured to allow a machine control means to be independently selected for each control system. The substance of the machine control means is a program.

Specifically, the multi-system numerical control device comprises a MDI (Manual Data Input) 20, a machine control means selecting unit 30, a selection state storage unit 40 for storing a selection state of the machine control means, a machine control means execution unit 50 and three servo control systems 60, 70 and 80, as shown in FIG. 4.

First of all, the MDI 20 is a device like a keyboard that allows an operator to input data manually and is used for manual input of various data and instructions required for the multi-system numerical control device. The present embodiment is configured to allow the operator, through the MDI 20, to input information (ID number, for instance) of the machine control means selected for each system (a first system 60, a second system 70 and a third system 80).

The machine control means selecting unit 30 accepts input data from the MDI 20 so as to write information (such as an ID number) of the machine control means selected for each system onto the selection state storage unit 40. The selection state storage unit 40 is composed of SRAM. The machine control means selecting unit 30 includes software for reading the input data from the MDI 20 and writing the input data onto the SRAM of the selection state storage unit 40.

The machine control means execution unit 50 allows the machine control means selected for each system (first system 60, second system 70 and third system 80) to be executed in accordance with the contents stored in the SRAM of the selection state storage unit 40. In the embodiment of FIG. 4, there is shown a situation where a turning function, a milling function and a loader function are respectively selected for the first system, the second system and the third system.

The systems (first system 60, second system 70 and third system 80) have respectively program analysis units 61, 71 and 81 for analyzing machine control means (a program) specified by the machine control means execution unit 50, interpolation control units 62, 72 and 82 for performing interpolation processing on the basis of output of the program analysis units 61, 71 and 81, and axis control units 63, 73 and 83 for controlling servo amplifiers of respective axes according to output of the interpolation control units 62, 72 and 82.

In the embodiment of FIG. 4, the machine control means execution unit 50 allows the program analysis unit 61 of the first system 60 to read a machining program (generally, a program dedicated to the machine control means selected for the first system) dedicated to the turning function, and then controls a S-axis servo motor (spindle axis drive) and X- and Y-axis servo motors (worktable drive) of a turning machine through program analysis, interpolation and axis control to thereby allow turning to be performed.

The machine control means execution unit 50 also allows the program analysis unit 71 of the second system 70 to read a machining program (generally, a program dedicated to the machine control means selected for the second system) dedicated to the milling function, and then controls a S-axis servo motor (spindle axis drive), and X- Y- and Z-axis servo motors (worktable drive) of a milling machine through program analysis, interpolation and axis control to thereby allow milling to be performed.

The machine control means execution unit 50 further allows the program analysis unit 81 of the third system 80 to read a program (generally, a program dedicated to the machine control means selected for the third system) dedicated to the loader control function, and then controls A- and B-axis servo motors of a loader through program analysis, interpolation and axis control to thereby allow loading (operations of mounting or removing a work) to be performed.

It is to be noted that machining (including loading) performed by each system may be one that is applied to the same work or a plurality of different works. The former case allows a plurality of different kinds of machining to be performed on the same work. The latter case allows a plurality of different kinds of machining to be performed on a plurality of works simultaneously. As the case may be, it is also allowable to select the same kind of machine control means for two or more of the plurality of systems (select the machine control means of the turning function for both of the first and third systems 60 and 80, for instance).

Figure 5:
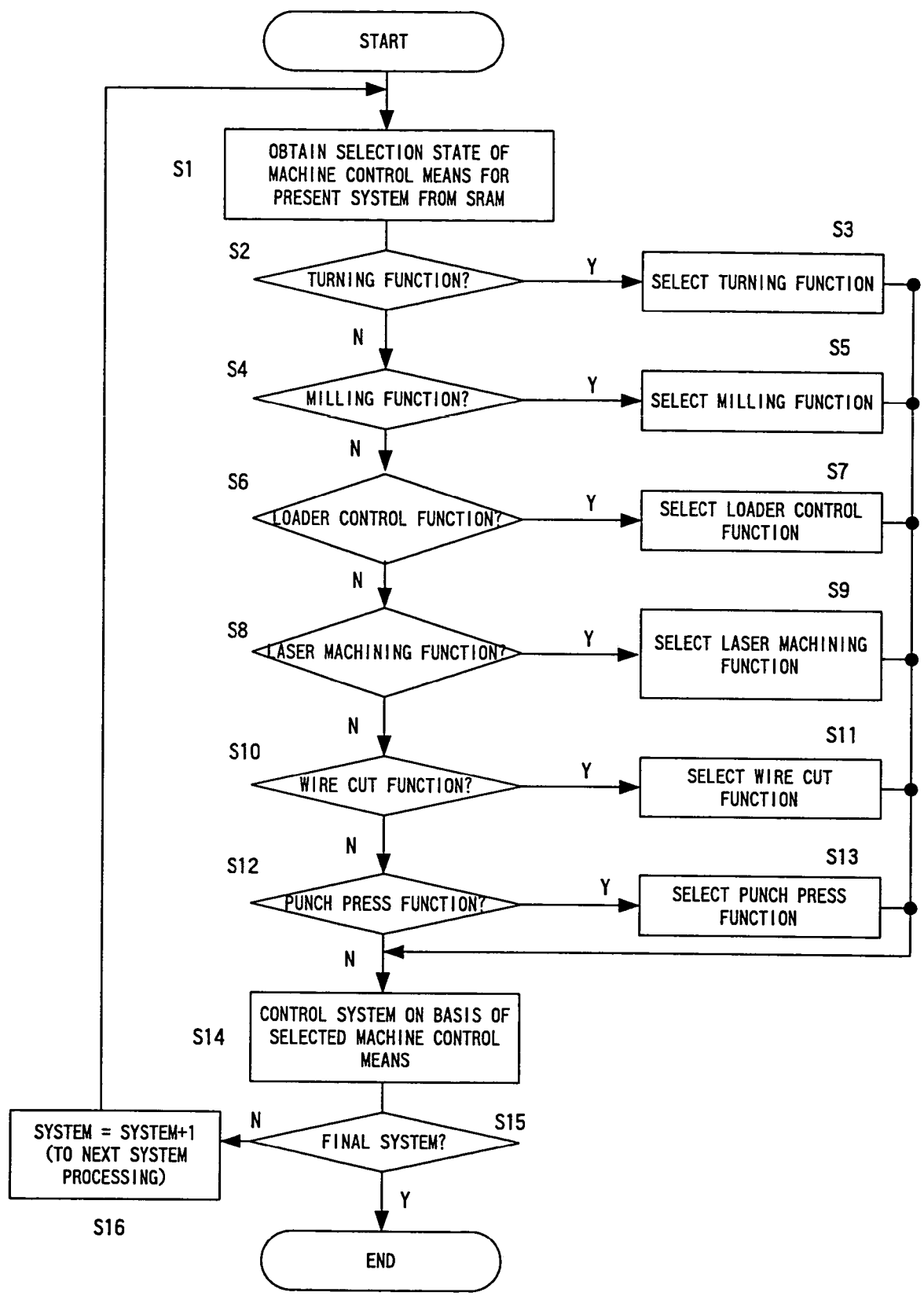
FIG. 5 is a flow chart showing an outline of the procedure required for a machine control means executing means to determine a machine control means of each system according to the embodiment of the present invention.

FIG. 5 is a flow chart showing an outline of the procedure required for the machine control means execution means to specify the machine control means to each of six systems (systems 1 to 6). In the present embodiment, there is shown a case where selection of the machine control means is performed so as to specify a turning function to system 1, a milling function to system 2, a loader control function to system 3, a laser machining function to system 4, a wire cut discharge machining function to system 5 and a punch press function to system 6, and execution of the selected machine control means is started in such a manner as to start reading of programs dedicated to the respective machine control means.

Each step of the flowchart is summarized as follows.

Step 1: Selection instruction contents of the machine control means for "the present system" are obtained from the storage means (SRAM) in which a selection state of the machine control means is stored. Herein, "the present system" is initially set to be "system 1", so that processing for system 1 is executed in the initial processing cycle (Steps 1 to 15), and then processing for system N (N=2, 3, . . . ) is executed in the N-th processing cycle (see Step 16).

Step S2: Whether or not selection of the turning function for the present system is instructed is judged. If the result of judgment is "Yes", the processing proceeds to Step S3. If the result of judgment is "No", the processing proceeds to Step S4.

Step S3: The machine control means selected for the present system is determined to be the turning function, and the processing proceeds to Step S14.

Step S4: Whether or not selection of the milling function for the present system is instructed is judged. If the result of judgment is "Yes", the processing proceeds to Step S5. If the result of judgement is "No", the processing proceeds to Step S6.

Step S5: The machine control means selected for the present system is determined to be the milling function, and the processing proceeds to Step S14.

Step S6: Whether or not selection of the loader function for the present system is instructed is judged. If the result of judgment is "Yes", the processing proceeds to Step S7. If the result of judgment is "No", the processing proceeds to Step S8.

Step S7: The machine control means selected for the present system is determined to be the loader function, and the processing proceeds to Step S14.

Step S8: Whether or not selection of the laser machining function for the present system is instructed is judged. If the result of judgement is "Yes", the processing proceeds to Step S9. If the result of judgement is "No", the processing proceeds to Step S10.

Step S9: The machine control means selected for the present system is determined to be the laser machining function, and the processing proceeds to Step S14.

Step S10: Whether or not selection of the wire cut discharge machining function for the present system is instructed is judged. If the result of judgement is "Yes", the processing proceeds to Step S11. If the result of judgement is "No", the processing proceeds to Step S12.

Step S11: The machine control means selected for the present system is determined to be the wire cut discharge machining function, and the processing proceeds to Step S14.

Step S12: Whether or not selection of the punch press function for the present system is instructed is judged. If the result of judgment is "Yes", the processing proceeds to Step S13. If the result of judgment is "No", the processing proceeds to Step S14.

Step S13: The machine control means selected for the present system is determined to be the punch press function, and the processing proceeds to Step S14.

Step S14: Control is started on the basis of the machine control means determined for the present system (start reading of a program dedicated to the selected machine control means).

Step S15: Whether or not a final system is reached is judged. If the result of judgement is "Yes", the processing for selection for each system is terminated. If the result of judgment is "No", the processing proceeds to Step S16.

Step S16: An index representing "the present system" is incremented by 1, and the processing returns to Step S1.

In the following processing, the processing cycle is repeated until the judgment in Step S15 results in "Yes". As described above, selection of the machine control means is performed for all the systems, so that a plurality of kinds of machining (including loading) may be proceeded in a concurrent manner.

It is to be noted that three systems shown in the present embodiment are merely an instance, and typically, two or more arbitrary number of systems may be used. Alternatively, the selectable machine control means is by no means limited to the tuning function, the milling function, the loader function, the laser machining function, the punch press function and the wire cut function, and all the machine control means that need numerical control are also supposed to be applicable.

As has been described in the foregoing, according to the present invention, even the machining that needs a plurality of different kinds of machining (including loading) such as lathing (turning) and milling, for instance, may be performed simultaneously using a single multi-system numerical control device. This allows a plurality of works that need turning and milling or the like to be machined simultaneously without using a plurality of numerical control devices, leading to an effect of contribution to improvement of machining efficiency, together with attainment of a reduction in cost.

What is claimed is:

1. A multi-system numerical control device having a plurality of control systems, comprising;
   a selecting unit for selecting a machine control means for each of said plurality of control systems;
   a selection state storage unit for storing a selection state of the machine control means selected for each control system by said selecting unit; and
   an execution unit for executing the machine control means for each control system independently according to the selection state stored in said selection state storage unit.

2. The multi-system numerical control device according to claim 1, wherein each of said control systems includes a program analysis unit for analyzing a program specified by said execution unit and an execution means.

3. The multi-system numerical control device according to claim 1, wherein it further comprises a manual input unit, and information of the machine control means is inputted through the manual input unit and then stored in said machine control means storage unit through said selecting unit.

4. The multi-system numerical control device according to claim 1, wherein said machine control means is a program for attaining a turning function.

5. The multi-system numerical control device according to claim 1, wherein said machine control means is a program for attaining a milling function.

* * * * *